United States Patent
Chiang

(10) Patent No.: US 9,142,348 B2
(45) Date of Patent: Sep. 22, 2015

(54) ANTENNA WITH A CONCENTRATED MAGNETIC FIELD

(71) Applicant: AUTOMOTIVE RESEARCH & TESTING CENTER, Lugang Chen, Changhua Hsien (TW)

(72) Inventor: Chao-Wen Chiang, Changhua Hsien (TW)

(73) Assignee: AUTOMOTIVE RESEARCH & TESTING CENTER, Lugang Chen, Changhua Hsien (TW)

( * ) Notice: Subject to any disclaimer, the term of this patent is extended or adjusted under 35 U.S.C. 154(b) by 462 days.

(21) Appl. No.: 13/722,443

(22) Filed: Dec. 20, 2012

(65) Prior Publication Data

US 2014/0176274 A1    Jun. 26, 2014

(51) Int. Cl.
  *H01F 38/14* (2006.01)
  *B60L 11/18* (2006.01)
  *H02J 17/00* (2006.01)
  *H01F 27/42* (2006.01)

(52) U.S. Cl.
  CPC .............. *H01F 38/14* (2013.01); *B60L 11/182* (2013.01); *B60L 11/1831* (2013.01); *B60L 11/1833* (2013.01); *H02J 17/00* (2013.01)

(58) Field of Classification Search
  USPC .......................................... 307/104
  See application file for complete search history.

(56) References Cited

U.S. PATENT DOCUMENTS 7,227,504 B2    6/2007   Deguchi et al.

*Primary Examiner* — Robert Deberadinis
(74) *Attorney, Agent, or Firm* — patenttm.us

(57) ABSTRACT

An antenna with a concentrated magnetic field has a main coil and at least one pair of auxiliary coils. Each of the main coil and each auxiliary coil has at least one coil conductor. Each one of the at least one coil conductor has a virtual reference plane. The at least one pair of auxiliary coils are mounted around the main coil and an included angle is formed between the virtual reference plane of each coil conductor of each auxiliary coil and that of each coil conductor of the main coil. Lines of magnetic field generated by each coil conductor of each auxiliary coil concentrate the lines of magnetic field of the main coil to orient to a corresponding virtual reference plane of the main coil, thereby solving the magnetic leakage and EMI easily occurring outside the zone of active transmission for conventional coils using electromagnetic induction.

16 Claims, 11 Drawing Sheets

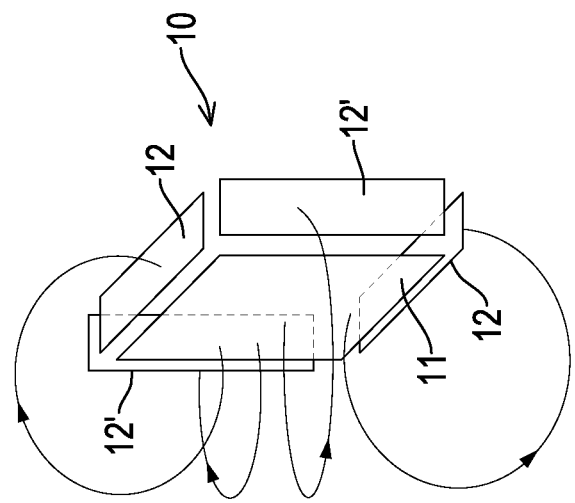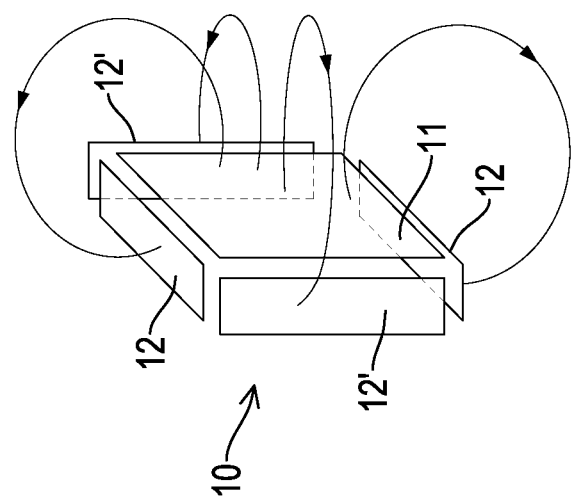
FIG.1

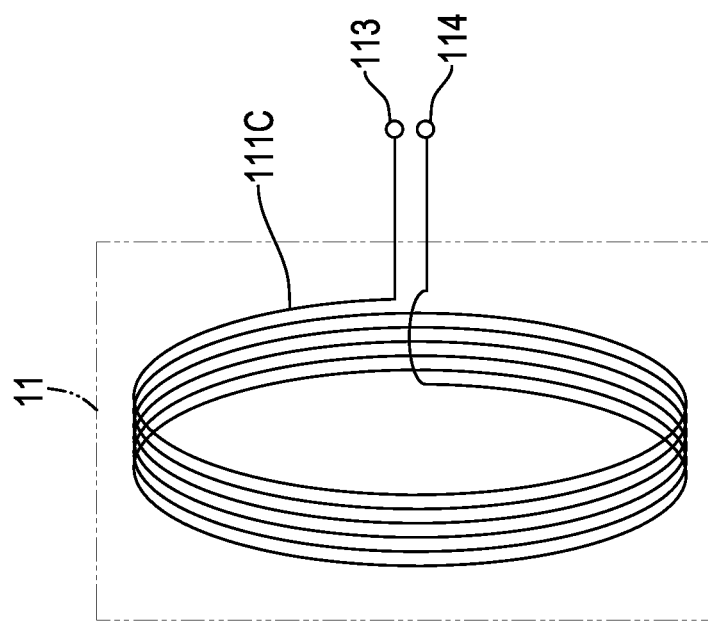

ANTENNA WITH A CONCENTRATED MAGNETIC FIELD

BACKGROUND OF THE INVENTION

1. Field of the Invention

The present invention relates to an antenna and more particularly to an antenna capable of concentrating radiating directions of lines of magnetic field.

2. Description of the Related Art

Rapid technological development allows rechargeable batteries to be used in wide range of products ranging from compact portable electronic products to electric cars/motorcycles. Electric power used to drive those products surely reduces environmental pollution and the clean power can be easily available to users. However, batteries are usually charged by wired battery chargers and the wired battery chargers from different manufacturers oftentimes differ from one another and are usually not interoperable because of incompatible connectors thereof.

In this regard, latest technique employs a wireless charging means to charge a battery. With reference to FIG. 9, an electronic product or an electric car/motorcycle has a wireless receiver 71 mounted thereon and a wireless power supply 72. The wireless power supply 72 has a RF (Radio Frequency) power amplifier 721 and a transmitting antenna 722. The wireless power supply converts an AC power into a DC power. The DC power is converted into electromagnetic waves by the RF power amplifier 721 and is transmitted to the wireless receiver 71 through the transmitting antenna 722. The wireless receiver 71 has a receiving antenna 711 and a rectifier 712. The receiving antenna 711 receives the electromagnetic waves and the rectifier 712 converts the electromagnetic waves into a DC power to charge an embedded battery. Although the electromagnetic induction between the transmitting and receiving antennae 722, 711 attains the wireless charging objective and gets rid of the operational inconvenience arising from the incompatible issues of the wired battery chargers and their connectors. Besides, magnetic leakage easily occurs if the transmitting and receiving antennae 722, 711 are not aligned to each other so that the efficiency of wireless power transmission is therefore reduced.

With reference to FIG. 10, a magnetic field distribution diagram of a ring coil 73 is shown. When the ring coil 73 is energized by current (I), according to the Ampere's right hand rule, the transmitting ring coil 73 will create a magnetic field (B). The lines of the magnetic field radiate outwards from the center of the ring coil 73 and return back to the center of the ring coil 73. With reference to FIG. 11, a schematic diagram of the distribution of magnetic field of wireless power transmission is shown. The two ring coils 73 are oppositely mounted. A zone of active transmission is formed between the ring coils 73, and two zones of inactive transmission are respectively formed around the distal outer edges of the ring coils 73. As being uniformly distributed, certain lines of magnetic field of the ring coils also pass through the zones of inactive transmission. When large current flows through the ring coils 73, electromagnetic interference (EMI) may arise from strong magnetic field distribution generated in the zones of inactive transmission.

With reference to FIG. 12, a network analyzer 81 is connected to a transmitting loop antenna 85 and a receiving loop antenna 84 through two respective impedance matching devices 83, 82. The network analyzer 81 sends a power signal to the transmitting loop antenna 85 via a first port (Port1) of the network analyzer 81, and the power signal is received by the receiving loop antenna 84 and is outputted to a second port (Port2) of the network analyzer 81. The network analyzer 81 analyzes parameters ($S_{11}$, $S_{21}$) by the received signals from the first port and the second port to obtain efficiencies of wireless power transmission of the loop antennae 84, 85.

However, when wirelessly transmitting power, the transmitting and receiving antennae 722, 711 of the wireless power supply 72 and the wireless receiver 71 or the ring coils 73 must be aligned to each other to avoid magnetic leakage during electromagnetic induction. Otherwise, magnetic leakage will occur and the efficiency of wireless power transmission is lowered. Additionally, surrounding electronic products are prone to the drawback of EMI because of the strong magnetic field distribution generated in the zones of inactive transmission in the electromagnetic field.

With reference to FIG. 13, as disclosed in U.S. Pat. No. 7,227,504 entitled "Gate antenna device", a powered coil 91 and four powerless coils 92 on an integrated circuit (IC) constitutes a gate antenna. The powered and powerless coils 91, 92 are rectangular and planar. The powerless coils 92 are perpendicularly connected with four edges of the powered coil 91 to constitute a box with one side open. When the powered coil 91 is energized to generate electric wave signals, the powerless coils 92 will generate induced current due to electromagnetic induction so as to concentrate the electric wave signals generated by the powered coil 91 and to radiate the electric wave signals toward the open edge or the X axis. The powerless coils 92 formed around the powered coil 91 can concentrate the electric wave signals of the powered coil 91 instead of radiating the electric wave signals to all directions. However, as the powerless coils 92 generates power from the electromagnetic induction of the powered coil 91, part of the electrical wave signals of the powered coil 91 are consumed by the electromagnetic induction and the intensity of the electric wave signals of the powered coil 91 is therefore reduced.

From the above-mentioned descriptions, the transmitting antenna 722 of the wireless power supply 72 is prone to magnetic leakage and the wireless charging efficiency is lowered. Moreover, the issue of EMI arises from a strong magnetic field distribution generated in the zones of inactive transmission of the electromagnetic field. Despite the concentrating capability of electric wave signals, the powerless coils 92 of the gate antenna concentrate electric wave signals from the electromagnetic induction of the powered coil 91, certain electric wave signals of the powered coil 91 are consumed and the intensity of entire electric wave signals is also lowered.

SUMMARY OF THE INVENTION

An objective of the present invention is to provide an antenna with a concentrated magnetic field capable of solving the magnetic leakage and EMI easily occurring outside the zone of active transmission during electromagnetic induction.

To achieve the foregoing objective, the antenna with a concentrated magnetic field has a main coil and at least one pair of auxiliary coils.

The main coil has at least one coil conductor and at least one virtual reference plane.

Each one of the at least one coil conductor has at least one feed point and at least one virtual reference plane.

The at least one virtual reference plane is respectively defined on the at least one coil conductor of the main coil for lines of magnetic field generated by the at least one coil conductor of the main coil to be concentrated in the at least one virtual reference plane.

Each pair of auxiliary coils is mounted on two edges of the main coil opposite to each other. Each auxiliary coil has at least one coil conductor and at least one virtual reference plane.

Each one of the at least one coil conductor has at least one feed point respectively and electrically connected to the at least one feed point of the main coil.

The at least one virtual reference plane is respectively defined on the at least one coil conductor.

An included angle is formed between each one of the at least one virtual reference plane of the auxiliary coil and each one of the at least one virtual reference plane of the main coil, and lines of magnetic field generated by the at least one pair of auxiliary coils concentrate the lines of magnetic field generated by the main coil to orient to the at least one virtual reference plane of the main coil.

From the foregoing antenna with a concentrated magnetic field, power is supplied to the main coil through the feed point thereof, the lines of magnetic field generated by each coil conductor of the main coil radiate outwards from a corresponding virtual reference plane. As the feed point of the main coil is electrically connected to the feed point of each auxiliary coil, the lines of magnetic field of each auxiliary coil concentrate the lines of magnetic field generated by the main coil to orient to a corresponding virtual reference plane of the main coil to concentrate and increase the magnetic flux density of the main coil and reduce magnetic leakage surrounding the main coil. Accordingly, the issues of the magnetic leakage arising from electromagnetic induction of the conventional coils, the strong magnetic field distribution generated in the zones of inactive transmission and causing EMI and the lowered intensity of the electric wave signals of the gate antenna due to the electric wave signals consumed by the powerless coils can be resolved.

Other objectives, advantages and novel features of the invention will become more apparent from the following detailed description when taken in conjunction with the accompanied drawings.

BRIEF DESCRIPTION OF THE DRAWINGS

FIG. 1 is a schematic diagram of an antenna with a concentrated magnetic field in accordance with the present invention;

FIG. 5 is a layout diagram of a fourth embodiment of a coil conductor of the antenna in FIG. 1;

DETAILED DESCRIPTION OF THE INVENTION

With reference to FIG. 1, an antenna with a concentrated magnetic field 10 in accordance with the present invention has a main coil 11 and two pairs of oppositely mounted auxiliary coils 12, 12'. The main coil 11 and each one of each pair of auxiliary coils 12, 12' are flat. In the present embodiment, the main coil 11 and each one of each pair of auxiliary coils 12, 12' is rectangular. The main coil 11 has four edges. Each pair of auxiliary coils 12, 12' are perpendicularly and correspondingly mounted on and connected with respective two of the four edges of the main coil 11 opposite to each other to constitute a box with one side open.

When the antenna with a concentrated magnetic field 10 is connected to a power source, the main coil 11 and each pair of auxiliary coils 12, 12' generate and concentrate a magnetic field in an outward direction so that the antenna 10 can serve as a transmitting antenna. When used to sense an external magnetic field, the antenna with a concentrated magnetic field 10 can serve as a receiving antenna.

Figure 4:
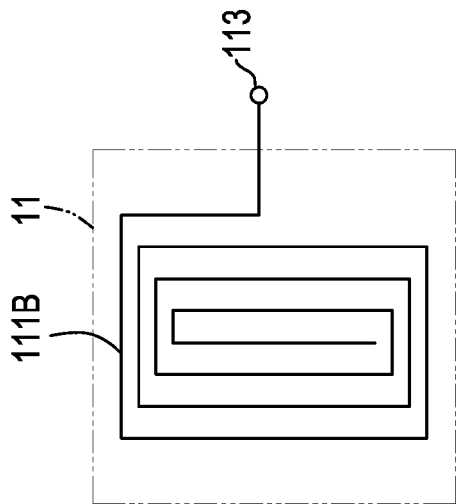
FIG. 4 is a layout diagram of a third embodiment of a coil conductor of the antenna in FIG. 1.
Figure 3:
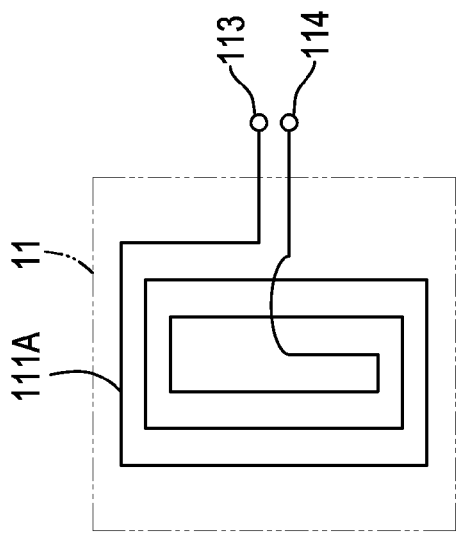
FIG. 3 is a layout diagram of a second embodiment of a coil conductor of the antenna in FIG. 1.
Figure 2:
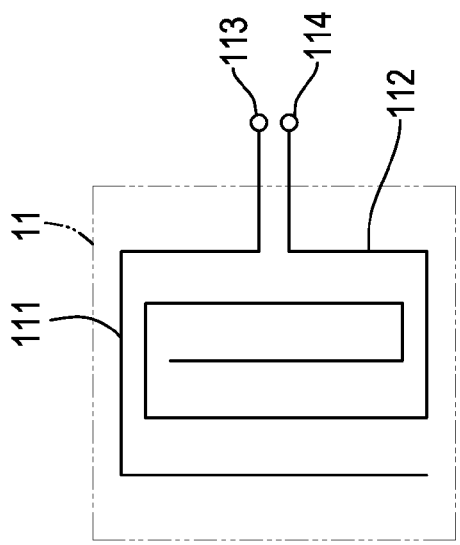
FIG. 2 is a layout diagram of a first embodiment of a coil conductor of the antenna in FIG. 1.

With reference to FIGS. 2 to 4, the main coil 11 has at least one coil conductor 111 being loop-shaped and wound with multiple turns. Each one of the at least one coil conductor 111 has at least one feed point 113 and defines a virtual reference plane thereon and concentrates lines of magnetic field generated by the coil conductor 111. The virtual reference plane is outlined by the dash-dotted line. With further reference to FIG. 2, the main coil 11 has two coil conductors 111, 112. Each coil conductor 111, 112 is loop-shaped and wound with multiple turns. The two coil conductors 111, 112 are wound in opposite directions. The relatively outer coil conductor 111 is wound counterclockwise while the relatively inner coil conductor 112 is wound clockwise. Each coil conductor 111, 112 has a feed point 113, 114 on one end thereof for connecting to a power source or one auxiliary coil 12, 12' of one of the pairs. Lines of magnetic field generated by the coil conductor 111 are concentrated within the coplanar virtual reference planes defined by the respective coil conductor 111, 112 of each auxiliary coil 12, 12'.

With reference to FIG. 3, the main coil 11 has one coil conductor 111A. The coil conductor 111A is loop-shaped and wound counterclockwise with multiple turns, and has two feed points on two ends of the coil conductor 111A for respectively connecting to a power source and one auxiliary coil 12, 12' of one of the pairs.

With reference to FIG. 4, the main coil 11 has one coil conductor 111B. The coil conductor 111B is loop-shaped and wound counterclockwise with multiple turns, and has one feed point 113 on one end thereof for connecting to a power source.

With reference to FIG. 5, the main coil 11 has one coil conductor 111C. The coil conductor 111C is helical and wound counterclockwise with multiple rounds, defines a virtual reference plane therethrough and concentrates lines of magnetic field generated by the coil conductor 111C, and has two feed points 113, 114 on two ends thereof for connecting to a power source.

The coil conductors 111, 111B shown in FIGS. 2 and 4 are an open-end type. The coil conductor 111A shown in FIG. 3 is a short-end type.

Each pair of auxiliary coils 12, 12' may have a layout of coil conductor identical to or different from that of the coil conductor 111, 112 of the main coil 11.

Figure 6:
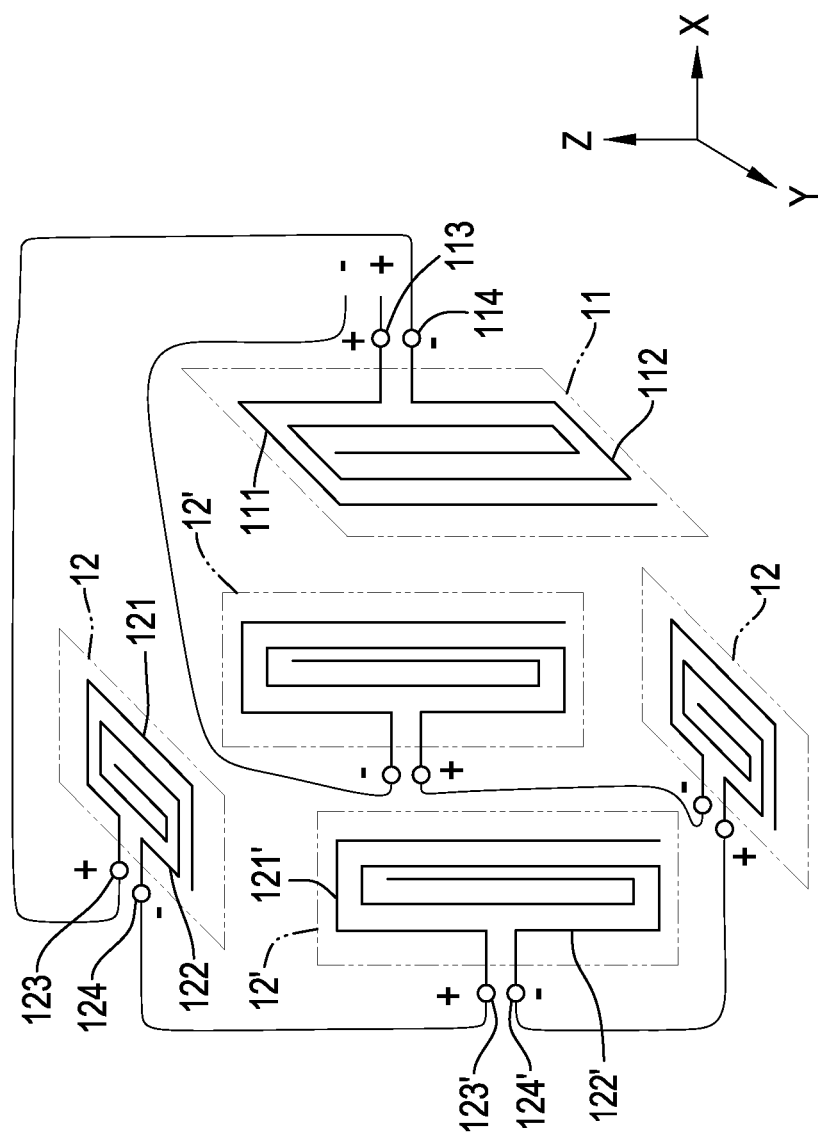
FIG. 6 is a wiring diagram of coils of the antenna in FIG. 1.

With reference to FIG. 6, each pair of auxiliary coils 12, 12' is perpendicular to the virtual reference plane of the main coil 11, and each auxiliary coil 12, 12' of one of the two pairs has two coil conductors (121, 122), (121', 122') respectively defining two virtual reference planes and wound in opposite directions. An included angle is formed between the coplanar virtual reference planes of each auxiliary coil 12, 12' and the main coil 11 and is in a range of 30° to 150°. In the present embodiment, the optimal value of the included angle is 90°. A relatively outer coil conductor 121, 121' of one of each pair is wound clockwise while a relatively inner coil conductor 122, 122' is wound counterclockwise. Each coil conductor 121, 122, 121', 122' is wound with multiple turns and has a feed point 123, 124, 123', 124'. One of the feed points 113 of the foregoing main coil 11 is connected to a positive electrode of a power source, and the other feed point 114 of the main coil 11 is connected to one of the feed points 123 of one auxiliary coil 12 of one of the pairs 12, 12'. The other feed point 124 of the auxiliary coil 12 is connected to one of the feed points 123' of one auxiliary coil 12' of the other of the pairs 12, 12'. By sequentially connecting the feed points in a similar pattern, and one of the feed points 123' of a last one auxiliary coil 12 is connected to a negative electrode of the power source. Hence, lines of magnetic fields generated by the auxiliary coils 12, 12' can be concentrated to orient to a direction of lines of magnetic field of the main coil 11, which is the direction of the X axis. As shown in FIG. 6, the pairs of auxiliary coils 12, 12' concentrate the lines of magnetic field generated by the main coil 11 to orient to the coplanar virtual reference planes defined by the respective coil conductors 111, 112 of the main coil 11, thereby concentrating all the lines of magnetic field of the main coil 11 and the pairs of auxiliary coils 12, 12' to orient to an identical direction and reducing magnetic leakage thereof.

There is no specific limitation concerning the sizes of each auxiliary coil 12, 12' and the main coil 11. However, when each auxiliary coil 12, 12' is a quarter of the main coil 11 in size, an optimal performance for concentration of lines of magnetic field and wireless power transmission efficiency can be acquired.

Figure 7:
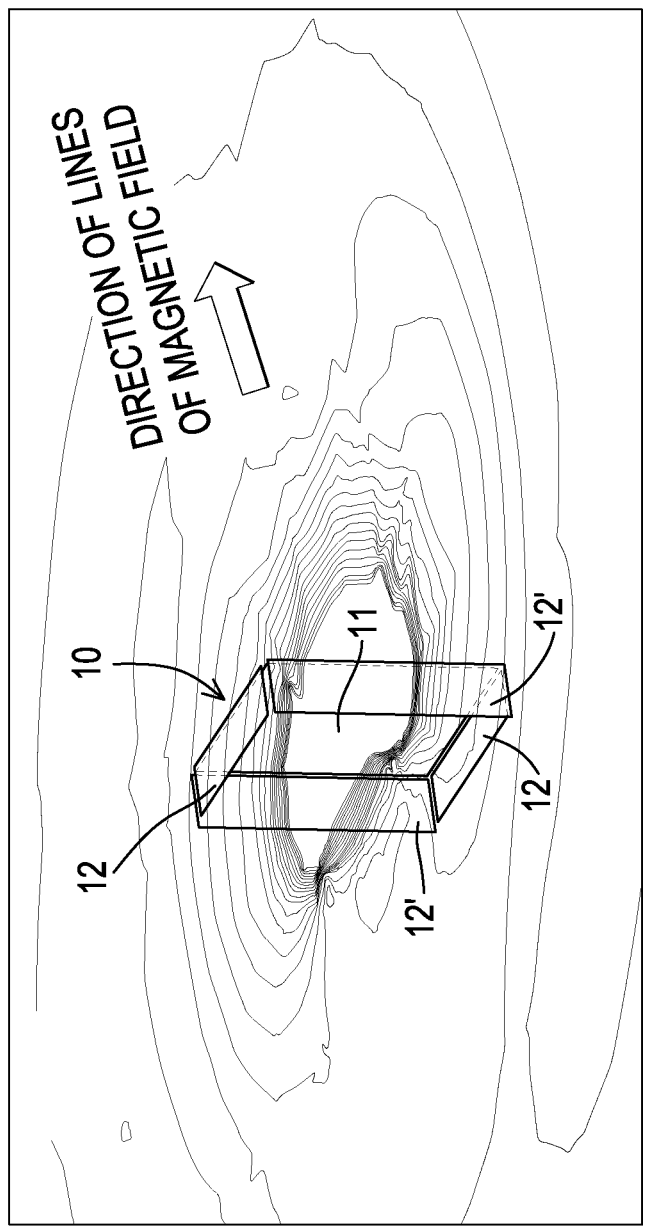
FIG. 7 is a schematic diagram illustrating a simulated radiating direction of lines of magnetic field of the antenna in FIG. 1.

With reference to FIG. 7, a simulated radiating direction of lines of magnetic field of the antenna 10 is shown. The simulation is illustrated in a two-dimensional fashion instead of a three-dimensional fashion in a physical simulation. After the type and corresponding parameters of the antenna 10 are inputted to antenna simulation software, a magnetic field generated by each pair of auxiliary coils 12, 12' is concentrated to orient to the right of the antenna 10 while the magnetic field to the left of the antenna 10 is sparsely distributed. Accordingly, the objective of the present invention intending to concentrate magnetic field can be achieved.

Each of the main coil 11 and the auxiliary coils 12, 12' is not limited to be rectangular and may also be circular, hexagonal, octagonal or other shape. Each one of each pair of auxiliary coils 12, 12' corresponds to or matches a contour of the main coil 11 so that each auxiliary coil 12, 12' can be correspondingly mounted on and connected with one of the four edges of the main coil 11. The coil conductors 111, 112, 121, 122, 121', 122' of the main coil 11 and each pair of auxiliary coils 12, 12' may be loop-shaped or spiral in shape when the coil conductors 111, 112, 121, 122, 121', 122' are coplanar, or may be helical in shape when the coil conductors 111, 112, 121, 122, 121', 122' are not coplanar, and may be the open-end type or the short-end type.

Figure 8:
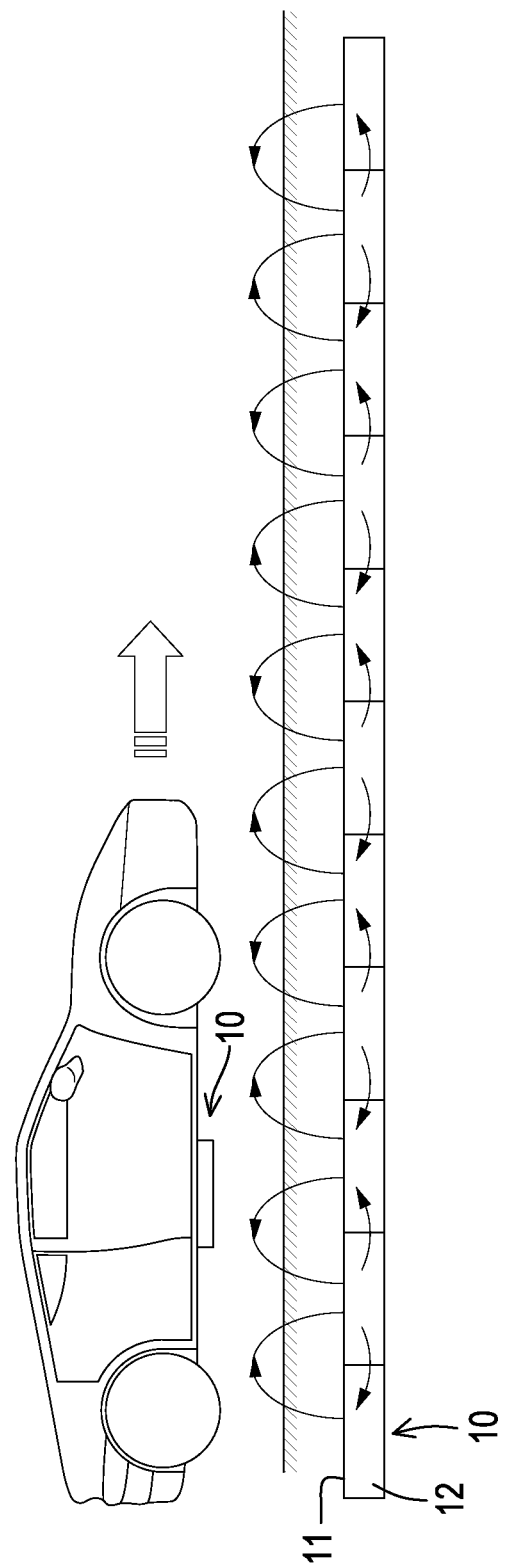
FIG. 8 is an operational schematic diagram of the antenna in FIG. 1 when dynamically supplying power.
Figure 9:
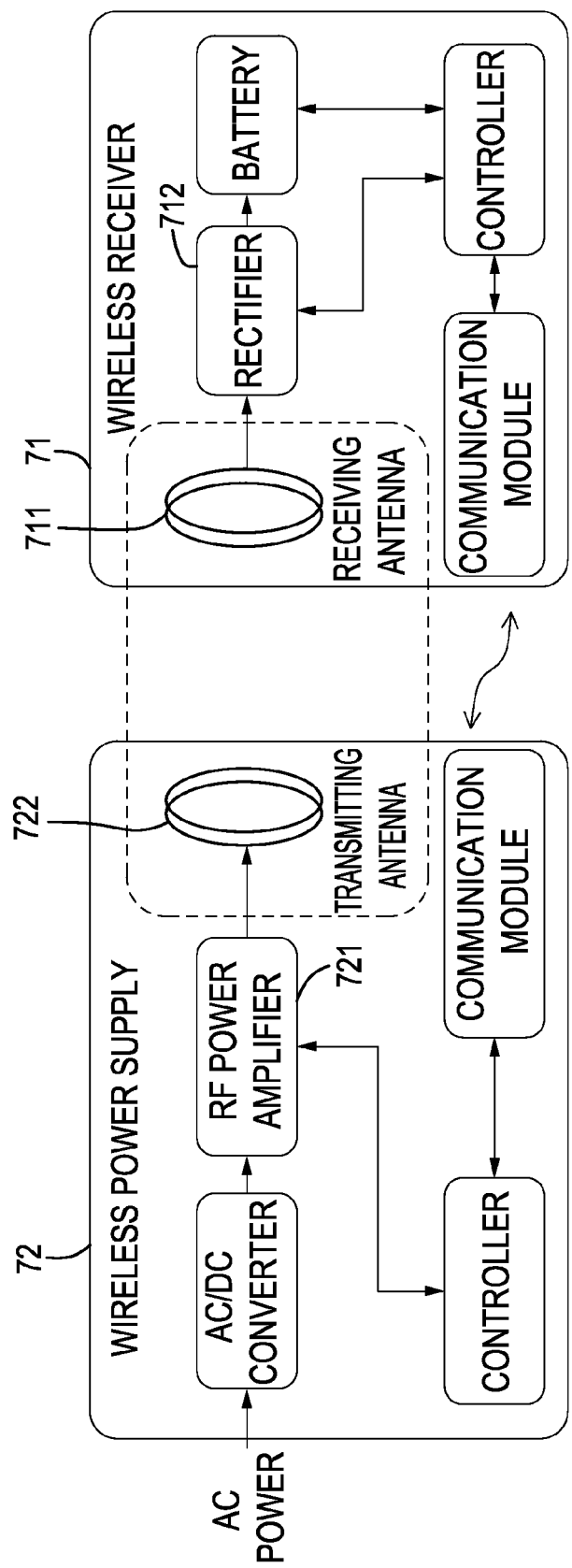
FIG. 9 is a functional block diagram of a conventional wireless charger.
Figure 10:
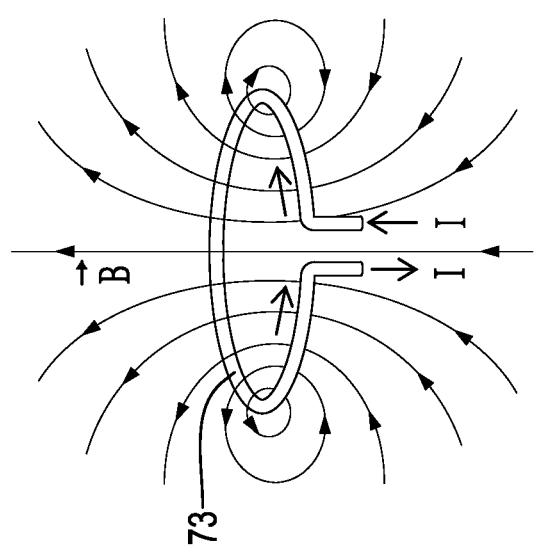
FIG. 10 is a schematic diagram illustrating lines of magnetic field of a conventional coil.
Figure 11:
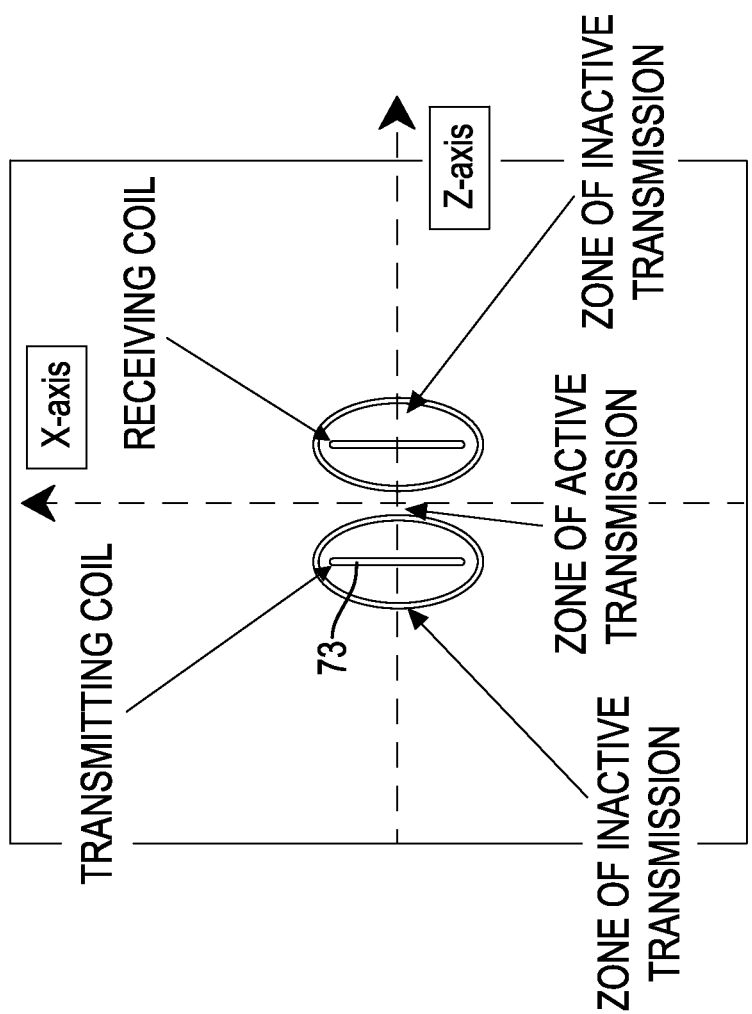
FIG. 11 is a schematic diagram illustrating the distribution of magnetic field of conventional ring coils.
Figure 12:
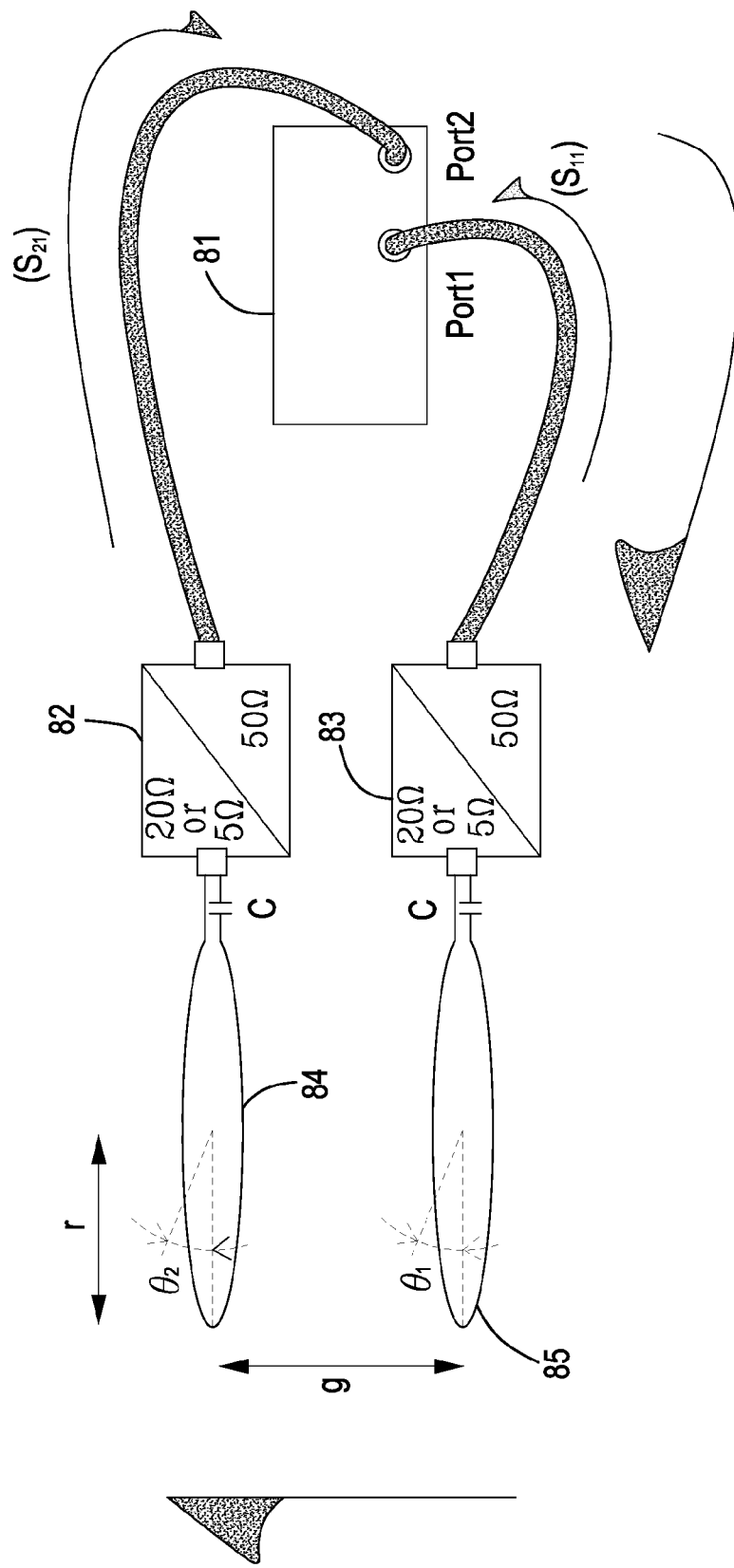
FIG. 12 is a schematic diagram illustrating a test for detecting efficiencies of wireless power transmission of conventional loop antennae.
Figure 13:
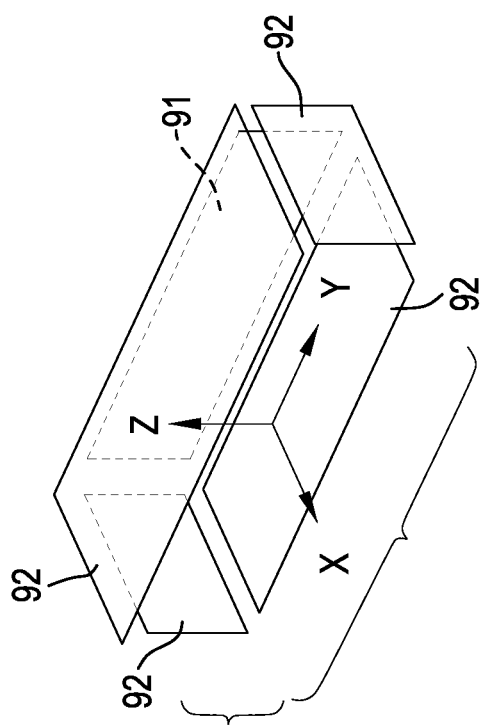
FIG. 13 is a schematic diagram of a conventional gate antenna.

With reference to FIG. 8, to dynamically supply power, multiple antennae 10 for transmitting power are sequentially mounted under the surface of a road, and an antenna 10 for receiving power is mounted on the chassis of a vehicle. The main coils 11 of the antennae 10 for transmitting power face the surface of the road to concentrate the lines of magnetic field of the main coils 11 to orient to the surface of the road, thereby increasing the distance and efficiency of wireless transmission. The main coil 11 of the antenna 10 on the chassis of the vehicle faces to the surface of the road to receive the lines of magnetic field of each antenna 10 for transmitting power. Accordingly, the issue of EMI to vehicles can be reduced.

From the above-mentioned descriptions, the magnetic field of the pairs of auxiliary coils 12, 12' concentrate the lines of magnetic field of the main coil 11 to orient to the virtual reference plane of the main coil 11, thereby concentrating and increasing the magnetic flux passing through the lines of magnetic field of the main coil 11 and lowering the magnetic leakage. As a result, the issues of the magnetic leakage arising from electromagnetic induction of the conventional coils, the strong magnetic field distribution generated in the zones of inactive transmission and causing EMI and the lowered intensity of the electric wave signals of the gate antenna due to the electric wave signals consumed by the powerless coils can be tackled.

Even though numerous characteristics and advantages of the present invention have been set forth in the foregoing descriptions, together with details of the structure and function of the invention, the disclosure is illustrative only. Changes may be made in detail, especially in matters of shape, size, and arrangement of parts within the principles of the invention to the full extent indicated by the broad general meaning of the terms in which the appended claims are expressed.

What is claimed is:

1. An antenna with a concentrated magnetic field, comprising:
    a main coil having:
        at least one coil conductor, each one of the at least one coil conductor having at least one feed point; and
        at least one virtual reference plane respectively defined on the at least one coil conductor of the main coil for lines of magnetic field generated by the at least one coil conductor of the main coil to be concentrated in the at least one virtual reference plane; and
    at least one pair of auxiliary coils, each pair of auxiliary coils mounted on two edges of the main coil opposite to each other, wherein each auxiliary coil has:
        at least one coil conductor, each one of the at least one coil conductor having at least one feed point respectively and electrically connected to the at least one feed point of the main coil; and
        at least one virtual reference plane respectively defined on the at least one coil conductor;
    wherein an included angle is formed between each one of the at least one virtual reference plane of the auxiliary coil and each one of the at least one virtual reference plane of the main coil, and lines of magnetic field generated by the at least one pair of auxiliary coils concentrate the lines of magnetic field generated by the main coil to orient to the at least one virtual reference plane of the main coil.

2. The antenna as claimed in claim 1, wherein the included angle is in a range of 30° to 150°, and an optimal value of the included angle is 90°.

3. The antenna as claimed in claim 2, wherein each auxiliary coil is a quarter of the main coil in size.

4. The antenna as claimed in claim 3, wherein the at least one coil conductor of the main coil and the at least one coil conductors of each auxiliary coil pertain to an open-end type or a short-end type.

5. The antenna as claimed in claim 1, wherein the main coil and each auxiliary coil of each pair of the at least one pair are flat and rectangular and are correspondingly mounted on and connected with the respective two of the four edges of the main coil opposite to each other to constitute a box with one side open.

6. The antenna as claimed in claim 4, wherein the main coil and each auxiliary coil of each pair of the at least one pair are flat and rectangular and are correspondingly mounted on and connected with the respective two of the four edges of the main coil opposite to each other to constitute a box with one side open.

7. The antenna as claimed in claim 1, wherein each of the main coil and each auxiliary coil has two coil conductors, each coil conductor is wound with multiple turns, the two coil conductors are wound in opposite directions, the relatively outer one of the two coil conductors is wound counterclockwise, and the relatively inner one of the two coil conductors is wound clockwise.

8. The antenna as claimed in claim 4, wherein each of the main coil and each auxiliary coil has two coil conductors, each coil conductor is wound with multiple turns, the two coil conductors are wound in opposite directions, the relatively outer one of the two coil conductors is wound counterclockwise, and the relatively inner one of the two coil conductors is wound clockwise.

9. The antenna as claimed in claim 5, wherein each of the main coil and each auxiliary coil has two coil conductors, each coil conductor is wound with multiple turns, the two coil conductors are wound in opposite directions, the relatively outer one of the two coil conductors is wound counterclockwise, and the relatively inner one of the two coil conductors is wound clockwise.

10. The antenna as claimed in claim 6, wherein each of the main coil and each auxiliary coil has two coil conductors, each coil conductor is wound with multiple turns, the two coil conductors are wound in opposite directions, the relatively outer one of the two coil conductors is wound counterclockwise, and the relatively inner one of the two coil conductors is wound clockwise.

11. The antenna as claimed in claim 1, wherein each one of the at least one coil conductor of each of the main coil and each auxiliary coil is helical or spiral.

12. The antenna as claimed in claim 4, wherein each one of the at least one coil conductor of each of the main coil and each auxiliary coil is helical or spiral.

13. The antenna as claimed in claim 5, wherein each one of the at least one coil conductor of each of the main coil and each auxiliary coil is spiral.

14. The antenna as claimed in claim 6, wherein each one of the at least one coil conductor of each of the main coil and each auxiliary coil is spiral.

15. The antenna as claimed in claim 7, wherein each one of the at least one coil conductor of each of the main coil and each auxiliary coil is helical or spiral.

16. The antenna as claimed in claim 8, wherein each one of the at least one coil conductor of each of the main coil and each auxiliary coil is helical or spiral.

\* \* \* \* \*